(12) United States Patent
Delahaye et al.

(10) Patent No.: US 8,894,010 B2
(45) Date of Patent: Nov. 25, 2014

(54) AIRCRAFT FUSELAGE FRAME ELEMENT

(75) Inventors: Romain Delahaye, Colomiers (FR);
Patrick Lieven, Fronton (FR);
Christophe Mialhe, Giroussens (FR)

(73) Assignee: Airbus Operations SAS, Toulouse (FR)

( * ) Notice: Subject to any disclaimer, the term of this patent is extended or adjusted under 35 U.S.C. 154(b) by 97 days.

(21) Appl. No.: 13/607,096

(22) Filed: Sep. 7, 2012

(65) Prior Publication Data

US 2013/0306795 A1    Nov. 21, 2013

(30) Foreign Application Priority Data

Sep. 8, 2011 (FR) .................................... 11 57971

(51) Int. Cl.
*B64C 1/06* (2006.01)
*B64C 1/10* (2006.01)
*B64C 1/18* (2006.01)

(52) U.S. Cl.
CPC ................. *B64C 1/061* (2013.01); *B64C 1/068* (2013.01); *B64C 1/10* (2013.01); *B64C 1/18* (2013.01)
USPC .......................................... 244/119; 244/131

(58) Field of Classification Search
USPC ....... 244/117 R, 118.1, 119, 120, 129.1, 131, 244/133
See application file for complete search history.

(56) References Cited

U.S. PATENT DOCUMENTS

| | | | | |
|---|---|---|---|---|
| 4,479,621 A | * | 10/1984 | Bergholz | .................. 244/117 R |
| 4,648,570 A | * | 3/1987 | Abdelmaseh et al. | ..... 244/118.1 |
| 7,597,287 B2 | * | 10/2009 | Gay | ........................... 244/123.4 |
| 7,721,992 B2 | * | 5/2010 | Keeler et al. | ................... 244/119 |
| 7,861,970 B2 | * | 1/2011 | Griess et al. | ................... 244/120 |
| 8,403,261 B2 | * | 3/2013 | Delahaye et al. | .......... 244/118.5 |
| 8,408,492 B2 | * | 4/2013 | Benthien | .................... 244/118.1 |
| 8,439,307 B2 | * | 5/2013 | Westphal et al. | ............. 244/121 |
| 2008/0093503 A1 | | 4/2008 | Cacciaguerra | |
| 2008/0173755 A1 | * | 7/2008 | Benthien | .................... 244/118.1 |
| 2008/0217478 A1 | * | 9/2008 | Keeler et al. | ................... 244/119 |
| 2009/0294588 A1 | * | 12/2009 | Griess et al. | ................... 244/121 |
| 2009/0321569 A1 | | 12/2009 | Schroeer | |
| 2010/0230545 A1 | * | 9/2010 | Huber et al. | ................ 244/137.1 |
| 2013/0009008 A1 | | 1/2013 | Westphal | |
| 2013/0112811 A1 | * | 5/2013 | Mayer et al. | ................... 244/119 |

FOREIGN PATENT DOCUMENTS

| | | | | |
|---|---|---|---|---|
| DE | 10 2007 030 026 | | 1/2009 | |
| FR | 2 877 916 | | 5/2006 | |
| WO | WO 2007141291 A1 | * | 12/2007 | ................ B64C 1/00 |

OTHER PUBLICATIONS

French Search Report dated May 2, 2012.

* cited by examiner

*Primary Examiner* — Benjamin P Lee
(74) *Attorney, Agent, or Firm* — Dickinson Wright PLLC

(57) ABSTRACT

An aircraft fuselage frame assembly includes a first lower frame element having a cross member and a curved fuselage tub frame. A second upper frame element of the assembly has a cross member and a curved upper frame segment. A third frame element of the assembly is made of a cross member section, floor strut section and frame section. The third frame element is formed as a single, integral triangle element having a hypotenuse that is curved to adopt a curvature of the aircraft fuselage and joining portions at angle areas of the triangle. A lower frame link is joined to the first upper frame and at a first angle area of the triangle element; an upper frame link is joined to the second upper frame and at a second angle area of the triangle element; and a floor cross member is joined at a third angle area of the triangle element.

9 Claims, 5 Drawing Sheets

Fig. 2A
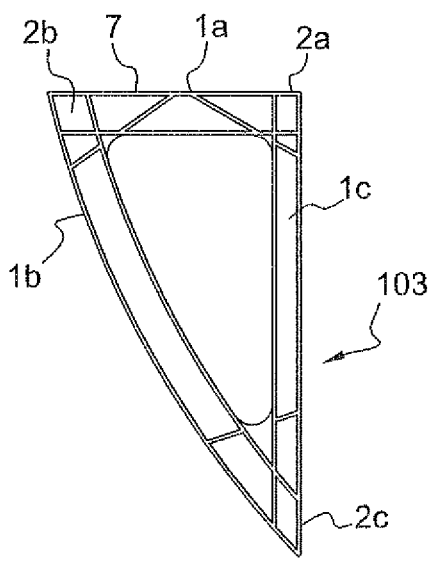
Fig. 2B
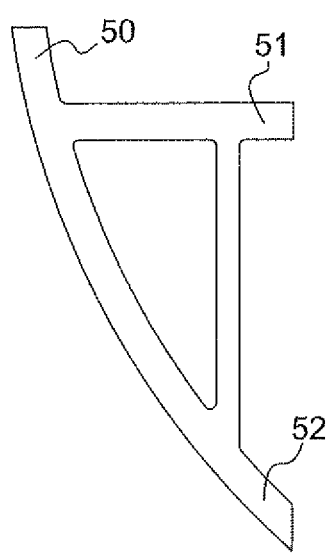
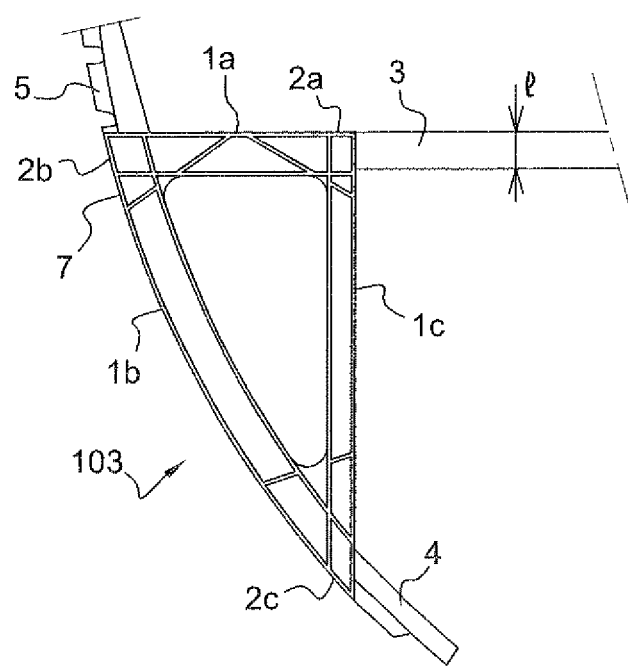
Fig. 3

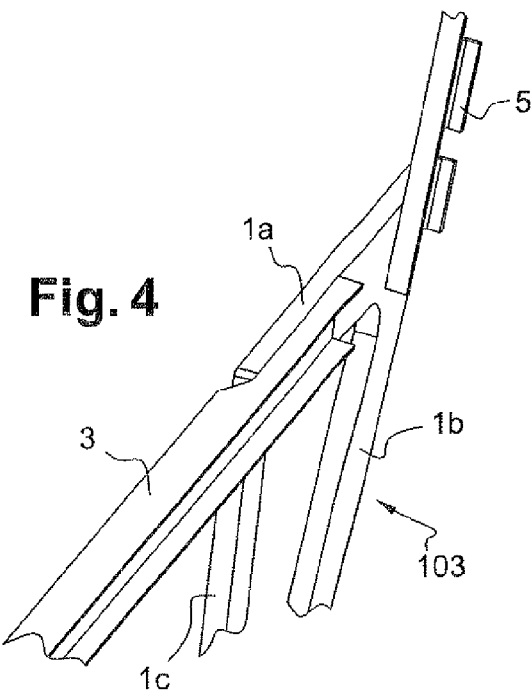
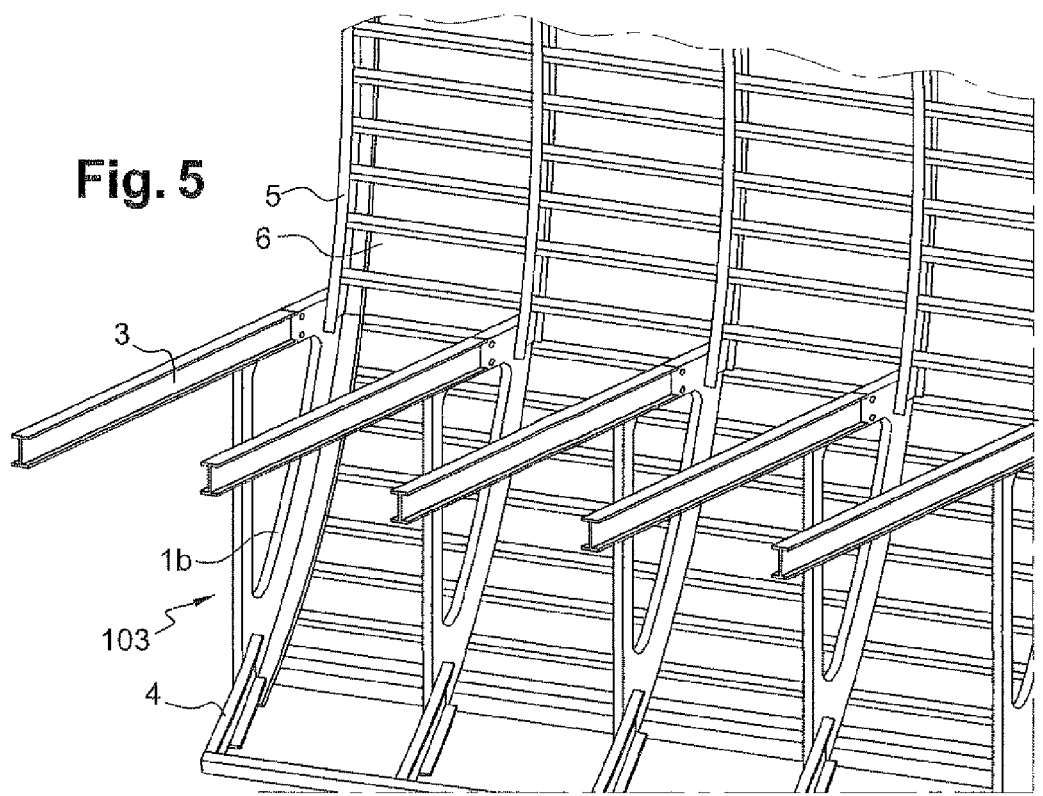

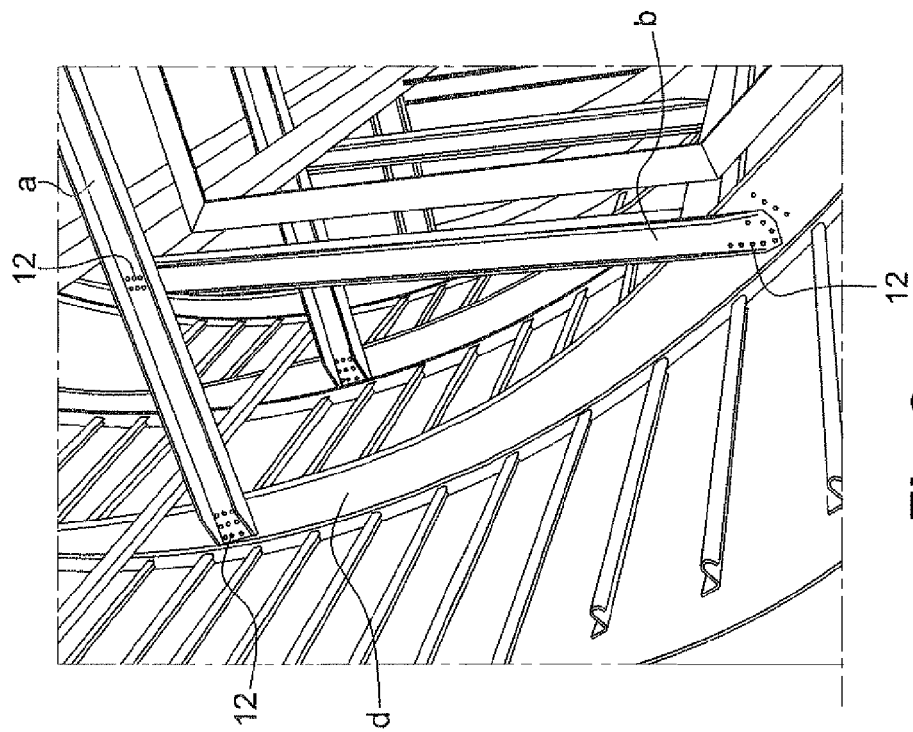
Fig. 8
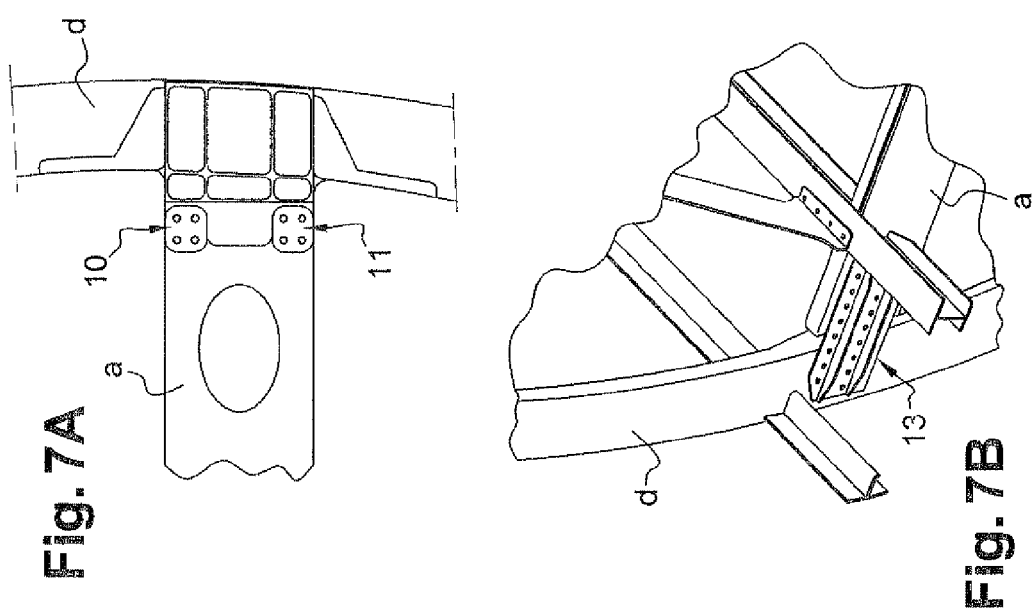
Fig. 7A
Fig. 7B

AIRCRAFT FUSELAGE FRAME ELEMENT

FIELD OF THE INVENTION

This invention concerns the realization of an aircraft fuselage frame element.

BACKGROUND OF THE INVENTION

On existing airplanes, the area located between the passenger floor, the airplane's skin and the floor struts is called "triangle".

On existing airplanes, floor cross members, frames and struts are simple parts, assembled one to the other either rigidly, in particular by embedding, or flexibly using joints.

The portion of the frame located under the cargo cross member, called "fuselage tub frame" comprises a curved frame element and a cross member that serves as a mount for the cargo floor.

The upper portion of the frame comprises an upper curved frame element and a cross member under which the luggage bins are fastened.

Joining these members together is realized by means of screws, rivets or other means of fastening.

Assembling these elements with each other requires much time because of the large number of fasteners that have to be installed, in particular between the floor cross member and the upper frame.

In particular the cross member/frame junction must be realized in an area where the forces to be transmitted are relatively large, i.e. for which the embedding torque is large. To achieve this, the heights of the frames and cross members are increased locally to make it possible to locate all the fasteners required for the junction.

To reduce the manufacturing cost of the member parts and simplify the definition of the parts that are in contact, the frames may be realized with extruded sections, machined members, folded members or members assembled together to form the frame elements such as frames.

It is not possible in general to keep a constant height at the junction with the cross members because of the large number of fasteners to be installed. Because of this, the cost of the simple part is increased.

Document FR 2 877 916 A1 describes a particular realization for which an upper frame comprises link arms to a floor cross member and to a lower frame.

However, for large aircrafts, such an upper frame is cumbersome and complex to realize.

SUMMARY OF THE INVENTION

Amongst the objectives underpinning this invention are: reducing the assembly cost and time of an aircraft fuselage; improving the airplane's performance by reducing the mass of the structure for the same functionality; reducing the number of parts making up the plane; and reducing manufacturing costs, since the parts are simpler to realize.

In particular, the aim of the invention is to simplify the design of the parts that make up the triangle area, the fuselage tub frames area and the upper portion of the frame.

To achieve this, this invention proposes an aircraft fuselage frame element that comprises a portion of cross member and a section of frame brought together into a single part.

According to a first embodiment, the aircraft fuselage frame element is made of a metal part.

The frame element is advantageously made of a machined part.

According to a second embodiment, the frame element is made of an integral composite material part.

The frame element comprises advantageously a portion of cross member, a section of frame and at least one strut; the portion of cross member, the section of frame and the strut are brought together into a single part, which forms an integral triangle.

The frame element then comprises joining portions at the angles of the generally triangular section.

Since the joining elements are areas subjected to lower forces, the height of the section of these parts remains constant in relation to the segments that connect the joining portions.

The integral triangle comprises advantageously a curved segment so as to adopt the curvature of the aircraft's skin.

According to an alternative embodiment, the section of frame is a curved upper or lower section of the aircraft's frame.

The frame element can then comprise at least one strut that connects the curved upper or lower section of the aircraft's frame to the cross member.

In addition, the invention concerns an assembly of aircraft fuselage frame and cross members that comprises a frame element according to the invention, for which the frame element connects an upper frame, a floor cross member and a lower frame, and comprises a segment that replaces a floor strut.

The at least one of: the floor cross member; the lower frame; and the upper frame, has advantageously a constant height with no bulges at its junctions with the adjacent element.

The invention concerns, in addition, an assembly of aircraft fuselage frame and cross members comprising a frame element according to the alternative embodiment of realization of the frame element according to the invention, for which the portion of cross member of the frame element forms a cargo cross member of the aircraft or forms a luggage bin mounting cross member.

The invention applies to an aircraft comprising at least one assembly of aircraft fuselage frame and cross members according to the invention.

BRIEF DESCRIPTION OF THE DRAWINGS

Other features and advantages of the invention will become apparent in reading the following description of a non-limiting example of the invention with reference to the drawings, which show:

in FIGS. 2A and 2B: two variants of fuselage frame elements according to a particular embodiment of the invention;

in FIG. 3: the frame element of FIG. 2 connected to an upper frame, a floor cross member and a lower frame;

in FIG. 4: a perspective view of the assembly of the frame element in FIG. 3 with the upper figure and the floor cross member;

in FIG. 5: a perspective view of a cross-section of an aircraft comprising elements according to the invention;

in FIGS. 7A and 7B: two examples of fastening systems applicable to the invention;

in FIG. 8: a third example of a fastening system applicable to the invention;

DETAILED DESCRIPTION OF THE INVENTION

The invention is described within the context of realizing aircraft fuselage frame elements.

Figure 1:
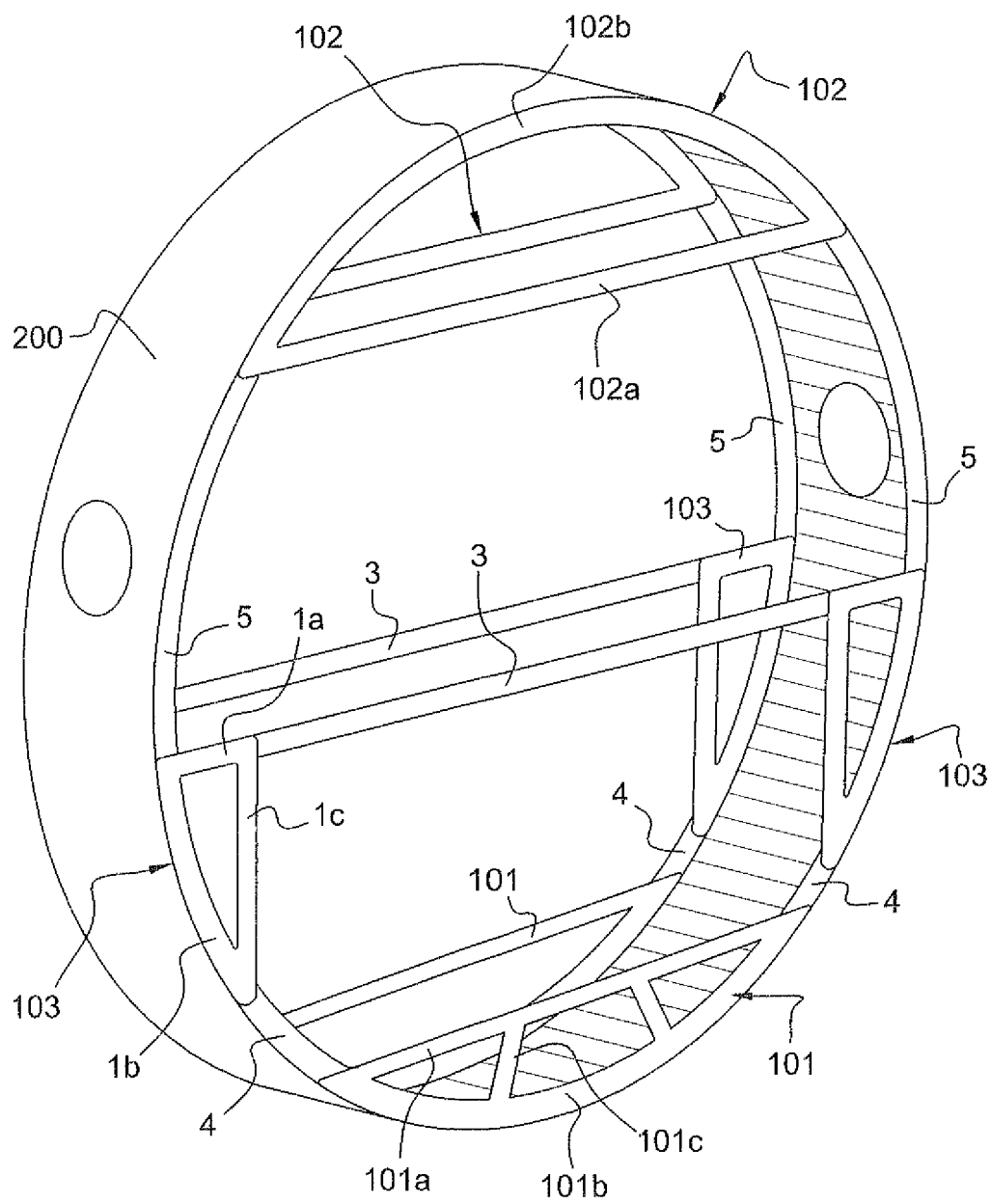
in FIG. 1: an aircraft fuselage section fitted with different embodiments of frame elements according to the invention.

According to FIG. 1, which represents a section of fuselage fitted with frame elements of the invention, three frame elements of the invention are used to realize complete aircraft frame and cross members.

The first element is a frame element 101 whose cross member portion 101a has the shape of a cargo cross member of the aircraft and comprising a lower frame segment 101b, called "fuselage tub frame", which is curved.

The second element is a frame element 102 whose cross member portion 102a forms an upper cross member for mounting the aircraft's luggage bins and that comprises a curved upper frame segment 102b that supports the roof of the plane.

The third element 103 is a frame element located between an upper frame, a floor cross member and a lower frame or cargo cross member.

Together with link segments 4 and 5, they make complete frames, on which the aircraft's fuselage 200 is assembled. FIG. 1 represents two successive frames, the assembly or a large portion of the aircraft frames that can be realized with the frame elements of the invention together or separately depending on the position and dimensions of the frames in question.

The aircraft fuselage frame elements 101, 102, 103 of the invention can be made of a metal part, particularly a machined part with the optimum mechanical characteristics, or be made of an integral part made of composite material; the frame elements are then realized, for example, with a juxtaposition of plies of composite material impregnated with a resin that will be polymerized to realize the finished part; the plies can be plies that make the frame element segments and that cross at the location of the joining portions, or cut-out plies forming all the segments and superimposed.

FIG. 2A represents the third frame element 103 made of a frame with a generally triangular section that comprises joining portions at the angles of the section and that is perforated at its center.

According to FIG. 2A the joining parts 2a, 2b, 2c are inside the corners of the triangle; in FIG. 2b, the joining portions 50, 51, 52 are projections that extend beyond the corners of the triangle.

The frame element 103 comprises a portion of cross member 1a, a section of frame 1b and a floor strut 1c brought together in a single part.

FIG. 3 represents a section of a complete aircraft framework of the invention in the area where the upper frame and the lower frame connect to the frame element 103 of the invention in which a piece of a floor cross member 3, a piece of lower frame 4 or cargo cross member and a piece of upper frame 5 are represented, The joining parts 2a, 2b, 2c to the floor cross member 3, the upper frame 5 and the lower frame 4 realized at the angles of the frame element of the invention are areas subject to less forces than the prior joining portions because the frame element 103 is a triangle realized in one single part; the height of the section of these parts remains substantially constant in relation to segments 1a, 1b, 1c connecting the joining portions.

In the same way, since the junctions of parts are realized in areas where the forces are lower, fewer fasteners are required to realize the junctions (triangle/frame, triangle/cross member) and the parts do not need to have projections to install more fasteners; thus, the joining portions 2a, 2b, 2c are able to have no reinforcing projections.

Since the floor cross member is connected to the triangle part in an area where the forces are lower, this cross member can be realized with a constant height, which reduces manufacturing costs.

Figure 6B:
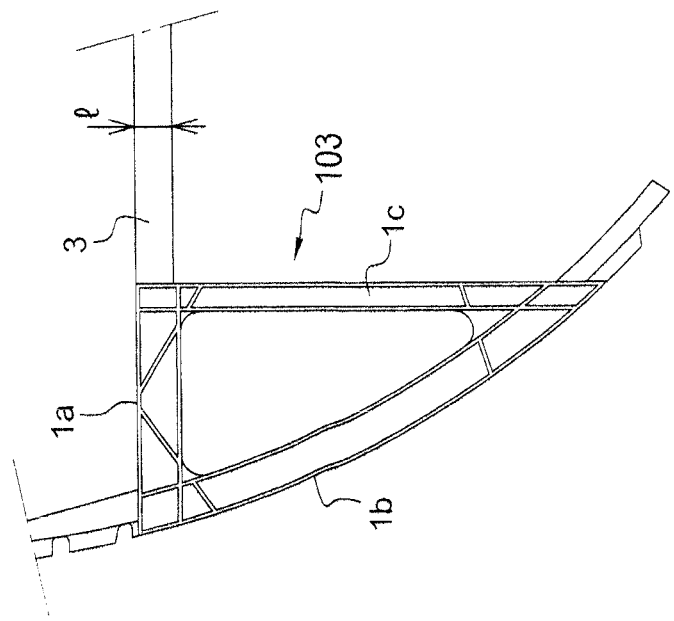
in FIGS. 6A and 6B: front views respectively of an assembly of cross members on a frame element according to the prior state of the art and by means of the frame element of the invention.
Figure 6A:
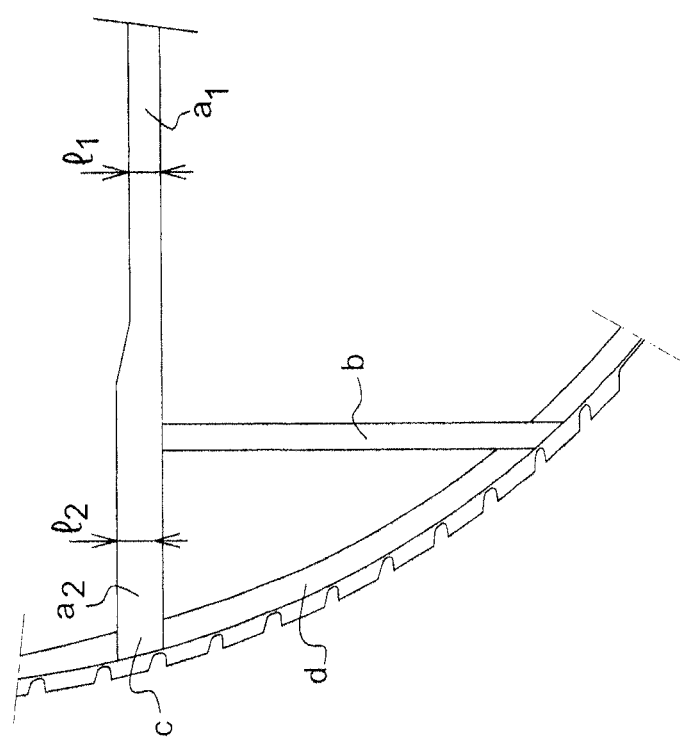

In particular, the floor cross member 3 retains a constant height l with no projections where it is joined to the frame element, as shown in FIG. 6B, whereas cross members of the prior art, represented in FIG. 6A comprised a projecting portion $l_2$ in its portion $a_2$ between the strut b and the junction c to the frame d in relation to its height $l_1$ in its central portion $a_1$.

Lastly, still according to FIG. 3, the frame element of the invention comprises reinforcing ribs 7 forming stiffeners that increase its rigidity in the areas of force transmission.

According to FIG. 4, which represents the junctions between the frame element 103, the floor cross member 3 and the upper frame 5, it is possible to assemble the parts previously mentioned without intermediate elements.

The floor cross member can, in particular, be an I-beam with its horizontal branches removed from one side in the area where it is joined to the frame element of the invention to realize a flat or overlapping connection.

Connections according to the prior state of the art can also be used, comprising upper 10 and lower 11 connecting links, such as shown in FIG. 7A, between a cross member a and a frame d of the prior art; links by fish-plates 13 as shown in FIG. 7B for these same parts; or bolted or riveted connections 12 as shown in FIG. 8 for a front connection with a cross member to a frame d and a strut b.

As shown in FIG. 5, which represents a portion of the aircraft, the frame elements 1c of the invention extend the upper frame portions 5 to the lower frames 4 and their segments 1b, forming the hypotenuse of the triangle, are curve so as to adopt the curvature of the skin 6 of the aircraft fuselage.

The cross member 3, the lower frame elements 4 and the upper frame elements 5 have the same height within the area where they are joined to the frame element 103 of the invention, only forming an integral triangle part outside this area, which simplifies their manufacture and decreases its cost.

Thus the portions connected to the triangle frame element of the invention have the same height in the area where they are joined to the integral triangle part as they have outside of the junction area, in particular on the side of the floor cross member and on the side of the lower frame or cargo cross member; the lower portion of the triangular junction 2c can in particular be dimensioned to receive a separate lower frame and a cargo cross member.

In the same way as the integral triangle 103 is installed instead of the assembled parts (frame, strut, cross member), the integral parts 101 and 102, which comprise an arc and a monobloc chord, are installed in the areas of the cargo cross members or of interface with the hat boxes (luggage bins) in the upper portion of the aircraft; this reduces the number of assemblies and makes these portions more rigid.

Generally speaking, this principle can be applied to integrate a strut into adjacent load-bearing elements. The frame elements 101 and 102 have the same advantages as the frame element 103 and, notably in a particular embodiment, they include one or several struts 1c as shown in FIG. 1 for the lower frame element 101.

The frame elements of the invention can also be realized with frame elements with a hollow body, such as hollow sections.

The invention is not limited to the example represented and in particular, other principles for joining the frame elements of the invention to the rest of the frame segments can be envisaged, such as welding, bonding, crimping, eccentric fasteners, articulations and embedding.

Similarly, the junctions can be cross member/frame junctions by overlap, shackled junctions, edge-to-edge junctions.

The invention claimed is:

1. An aircraft fuselage frame assembly, comprising:
   a first lower frame element;
   a second upper frame element;
   a third frame element made of a cross member section, floor strut section and frame section, wherein the cross member section, floor strut section and frame section are formed together as three sides of a single, integral triangle element, with the single, integral triangle element having a hypotenuse that is curved to adopt a curvature of the aircraft fuselage and joining portions at angle areas of the triangle;
   a lower frame link joined to the first lower frame element and joined by a connection link at a first angle area of the triangle element;
   an upper frame link joined to the second upper frame and joined by a connection link at a second angle area of the triangle element; and
   a floor cross member joined at a third angle area of the triangle element.

2. Aircraft fuselage frame assembly according to claim 1, wherein the assembly is made of a metal part.

3. Aircraft fuselage frame assembly according to claim 1, wherein the assembly is made of a machined part.

4. Aircraft fuselage frame assembly according to claim 1, wherein the assembly is made of composite material.

5. Aircraft fuselage frame assembly according to claim 1, wherein the joining portions are inside corners of the triangle element.

6. Aircraft fuselage frame assembly according to claim 1, wherein the joining portions are beyond corners of the triangle element.

7. Aircraft comprising at least one aircraft fuselage frame assembly according to claim 1.

8. Aircraft fuselage assembly according to claim 1, wherein the first lower frame element is comprised of a cross member and a curved fuselage tub frame, and the second upper frame element is comprised of a cross member and a curved upper frame segment.

9. Aircraft fuselage frame assembly, comprising:
   a first lower frame element;
   a second upper frame element;
   a third frame element made of a cross member section, floor strut section and frame section, wherein the third frame element is formed as a single, integral triangle element having a hypotenuse that is curved to adopt a curvature of the aircraft fuselage and joining portions at angle areas of the triangle;
   a lower frame link joined to the first lower frame element and joined by a connection link at a first angle area of the triangle element;
   an upper frame link joined to the second upper frame and joined by a connection link at a second angle area of the triangle element; and
   a floor cross member joined at a third angle area of the triangle element,
   wherein the floor cross member joined at the third angle area is comprised of an I-beam having horizontal branches removed at the angle area at which the floor cross member is joined to the triangle element to form a flat or overlapping connection.

* * * * *